(12) United States Patent
Rosner et al.

(10) Patent No.: US 7,251,811 B2
(45) Date of Patent: Jul. 31, 2007

(54) CONTROLLING COMPATIBILITY LEVELS OF BINARY TRANSLATIONS BETWEEN INSTRUCTION SET ARCHITECTURES

(75) Inventors: Roni Rosner, Binyamina (IL); Abraham Mendelson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 10/039,254

(22) Filed: Jan. 2, 2002

(65) Prior Publication Data

US 2003/0126587 A1 Jul. 3, 2003

(51) Int. Cl.
*G06F 9/455* (2006.01)

(52) U.S. Cl. .................. 717/138; 703/27; 712/227
(58) Field of Classification Search .............. 717/136, 717/137, 138, 139; 712/200, 208, 209, 227; 713/27; 718/1
See application file for complete search history.

(56) References Cited

U.S. PATENT DOCUMENTS

| | | | |
|---|---|---|---|
| 5,287,490 A | 2/1994 | Sites | |
| 5,301,325 A | 4/1994 | Benson | |
| 5,307,492 A | 4/1994 | Benson | |
| 5,307,504 A | 4/1994 | Robinson et al. | |
| 5,317,740 A | 5/1994 | Sites | |
| 5,339,238 A | 8/1994 | Benson | |
| 5,339,422 A | 8/1994 | Brender et al. | |
| 5,428,786 A | 6/1995 | Sites | |
| 5,432,795 A | 7/1995 | Robinson | |
| 5,450,575 A | 9/1995 | Sites | |
| 5,507,030 A | 4/1996 | Sites | |
| 5,574,887 A | 11/1996 | Fitch | |
| 5,574,927 A | 11/1996 | Scantlin | |
| 5,598,560 A | 1/1997 | Benson | |
| 5,802,373 A * | 9/1998 | Yates et al. | 717/139 |
| 5,875,318 A | 2/1999 | Langford | |
| 5,903,760 A * | 5/1999 | Farber et al. | 717/146 |
| 6,199,202 B1 * | 3/2001 | Coutant et al. | 717/138 |
| 6,243,668 B1 * | 6/2001 | Le et al. | 717/139 |
| 6,496,922 B1 * | 12/2002 | Borrill | 712/209 |
| 6,631,514 B1 * | 10/2003 | Le | 717/137 |

OTHER PUBLICATIONS

Erik R. Altman, et al., "Advances and Future Challenges in Binary Translation and Optimization," Nov. 2001, Proceedings of the IEEE, vol. 89, No. 11, pp. 1710-1722.*
Erik R. Altman, et al., "Welcome to the Opportunities of Binary Translation," IEEE Computer Magazine , Mar. 2000, pp. 40-46.*
Anton Chernoff, "FX!32, A profile-Directed Binary Translator," IEEE Micro, v. 18 n.2, Mar. 1998, pp. 56-64.*

(Continued)

*Primary Examiner*—Tuan Dam
*Assistant Examiner*—Eric B. Kiss
(74) *Attorney, Agent, or Firm*—Blakely, Sokoloff, Taylor & Zafman LLP

(57) ABSTRACT

In an embodiment, a method includes receiving a binary of a program code. The binary is based on a first instruction set architecture. The method also includes translating the binary, wherein the translated binary is based on a combination of the first instruction set architecture and a second instruction set architecture.

33 Claims, 4 Drawing Sheets

OTHER PUBLICATIONS

Cristina Cifuentes and Vishv Malhotra, "Binary Translation: Static, Dynamic, Retargetable?," Proceedings International Conference on Software Maintenance. Monterey, CA, Nov. 4-8, 1996. IEEE-CS Press. pp. 340-349.*

Cristina Cifuentes, et al., "The Design of a Resourceable and Retargetable Binary Translator," Proceedings of the Sixth Working Conference on Reverse Engineering, Atlanta, USA, Oct. 1999, IEEE-CS Press, pp. 280-291.*

Cristina Cifuentes and Mike Van Emmerik, "UQBT: Adaptable Binary Translation at Low Cost," Computer, vol. 33, No. 3, Mar. 2000, IEEE Computer Society Press, pp. 60-66.*

Kemal Ebcioglu, et al., "Dynamic Binary Translation and Optimization," Jun. 2001, IEEE Transactions on Computers, vol. 50, No. 6, pp. 529-548.*

Michael Gschwind, et al., "Dynamic and Transparent Binary Translation," Mar. 2000, IEEE, Computer, vol. 33, No. 3, pp. 54-59.*

Bich C. Le, "An Out-of-Order Execution Technique for Runtime Binary Translators," 1998, ACM, Proc. 8th ASPLOS, pp. 151-158.*

Cindy Zheng and Carol Thompson, "PA-RISC to IA-64: Transparent Execution, No Recompilation," 2000, IEEE Computer, vol. 33, No. 3, pp. 47-52.*

L. Gwennap, Transmeta Rewrites the Rules, Linux Journal, #72, Apr. 2000, pp. 126,130,131.

"IEEE Standard for Binary Floating-Point Arithmetic," ANSI/IEEE Standard 754-1985, Institute of Electrical and Electronics Engineers, Aug. 1985, pp. 1-18.

A. Peleg and U. Weiser, "MMX Technology Extension to the Intel Architecture," IEEE Micro, 16(4), pp. 42-50, Aug. 1996.

S. K. Raman, et al., "Implementing Streaming SIMD Extensions on the Pentium III Processor," IEEE Micro, 20(4), pp. 47-57, Jul./Aug. 2000.

G.M. Silberman and K. Ebcioglu, "An Architectural Framework for Supporting Heterogeneous Instruction-Set Architectures," IEEE Computer, 26(6), pp. 39-56, Jun. 1993.

R.L. Sites, et al., "Binary Translation," Communications of the ACM, 36(2), 14 pages, Feb. 1993.

M. Upton, "The Intel Pentium 4 Processor," in http://www.intel.com/pentium4, Oct. 2000, pp. 1-15.

Mark Probst, "Fast Machine-Adaptable Dynamic Binary Translation", *Proceedings of the Workshop on Binary Translation*, 2001, pp. 1-7.

Harold W. Cain, Kevin M. Lepak, and Mikko H. Lipasti, "A Dynamic Binary Translation Approach to Architectural Simulation", *Workshop on Binary Translation*, Oct. 2000 (in conjunction with PACT). Also appearing in Computer Architecture News, vol. 29, No. 1, Mar. 2001, pp. 1-10.

\* cited by examiner

CONTROLLING COMPATIBILITY LEVELS OF BINARY TRANSLATIONS BETWEEN INSTRUCTION SET ARCHITECTURES

FIELD OF THE INVENTION

The invention relates to computer processing. More specifically, the invention relates to translation of binaries across different instruction set architectures or different levels of optimizations with a same instruction set architecture.

BACKGROUND OF THE INVENTION

While current compilers of program code are designed to generate binaries that take advantage of the latest developments of current instruction set architectures (ISA), binaries generated based on a prior instruction set architecture are not able to employ these latest developments. Binary translation is a common method used to translate binaries of given program code/applications that are based on one instruction set architecture into binaries of given program code/applications that are based on a different instruction set architecture or a different subset of the same instruction set architecture. The different instruction set architecture may be a different architecture or an advanced version of the prior instruction set architecture.

Typically, binary translated programs are expected to deliver precisely the same functionality as provided by the original binary translated program that was based on the prior instruction set architecture. In other words, binary translations are typically expected to fully preserve program semantics as defined by the previous instruction set architecture, thereby providing full backward compatibility. Accordingly, the requirements of the previous instruction set architecture can include those associated with normal instruction flow, data precision, behavior of exceptions and other side effects of program execution defined by this previous instruction set architecture.

This semantic requirement typically confines the power of the binary translation—either by posing certain limitations on the translatable binaries or by restricting the amount of advantage the binary translation can take of the new instruction set architecture. For example, if the two different instruction set architectures do not support the same floating-point formats, widths or precisions, the binary translation between these instruction set architectures of floating-point operations may be difficult and/or inefficient.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

Embodiments of the present invention allow for a partially compatible instruction set architecture, wherein a binary of a program code that is generated for a first instruction set architecture is translated into a binary that employs certain features of a second instruction set architecture while remaining partially compatible with the first instruction set architecture. In an embodiment, the level of compatibility is controlled by the program environment, including, but not limited to, the user, the compiler and operating system. In one such embodiment, a set of compatibility modes or switches is defined on top of the second instruction set architecture. Accordingly, the program environment can explicitly set the desired compatibility mode. In one embodiment for hardware translation, the setting of the compatibility mode can be through a set of hardware instructions. In an embodiment for software translation, this setting of the compatibility mode can be through a number of command line flags used in conjunction with the initiation of the execution of the binary.

Therefore, as will be described in more detail below, embodiments of the present invention allow for an improvement in performance (related to the second instruction set architecture) in exchange for some deviation from the precise program semantics (related to the first instruction set architecture).

Additionally, in an embodiment, the different instruction set architectures on which the binaries (described herein) are based may be any of a number of different instruction set architectures, including, but not limited to, the different Complex-Instruction-Set-Computer (CISC) instruction sets as well as the different Reduced-Instruction-Set Computer (RISC) instruction sets. Examples of such instruction set architectures include Intel® IA-32 and Intel® IA-64.

Figure 1:
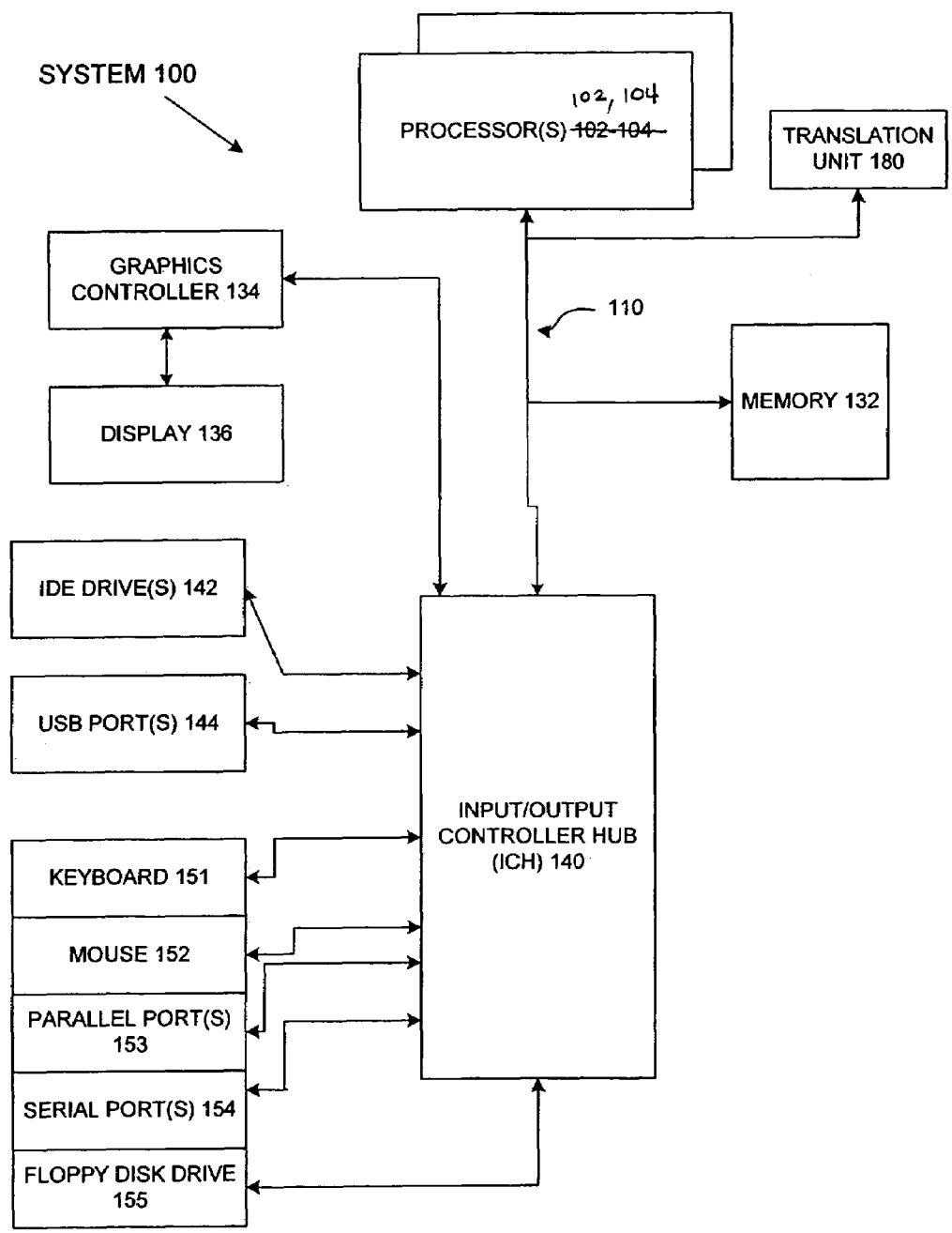
FIG. 1 illustrates an exemplary system 100 comprising processors 102 and 104 for controlling compatibility levels of binary translations between instruction set architectures, according to embodiments of the present invention.

FIG. 1 illustrates an exemplary system 100 comprising processors 102 and 104 for controlling compatibility levels of binary translations between instruction set architectures, according to embodiments of the present invention. Although described in the context of system 100, the present invention may be implemented in any suitable computer system comprising any suitable one or more integrated circuits.

As illustrated in FIG. 1, computer system 100 comprises processor 102 and processor 104. Computer system 100 also includes memory 132, processor bus 110 and input/output controller hub (ICH) 140. Processors 102 and 104, memory 132 and ICH 140 are coupled to processor bus 110. Processors 102 and 104 may each comprise any suitable processor architecture and for one embodiment comprise an Intel® Architecture used, for example, in the Pentium® family of processors available from Intel® Corporation of Santa Clara, Calif. Computer system 100 for other embodiments may comprise one, three, or more processors any of which may execute a set of instructions that are in accordance with embodiments of the present invention.

Memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD), for example, coupled to graphics controller 134.

ICH 140 provides an interface to I/O devices or peripheral components for computer system 100. ICH 140 may comprise any suitable interface controllers to provide for any suitable communication link to processors 102/104, memory 132 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144. ICH 140 for one embodiment also provides an interface to a keyboard 151, a mouse 152, one or more suitable devices, such as a printer for example, through one or more parallel ports 153, one or more suitable devices through one or more serial ports 154, and a floppy disk drive 155.

Additionally, computer system 100 includes translation unit 180. In an embodiment, translation unit 180 can be a process or task that can reside within main memory 132 and/or processors 102 and 104 and can be executed within processors 102 and 104. However, embodiments of the present invention are not so limited, as translation unit 180 can be different types of hardware (such as digital logic) executing the processing described therein (which is described in more detail below).

Accordingly, computer system 100 includes a machine-readable medium on which is stored a set of instructions (i.e., software) embodying any one, or all, of the methodologies described herein. For example, software can reside, completely or at least partially, within memory 132 and/or within processors 102/104. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 2:
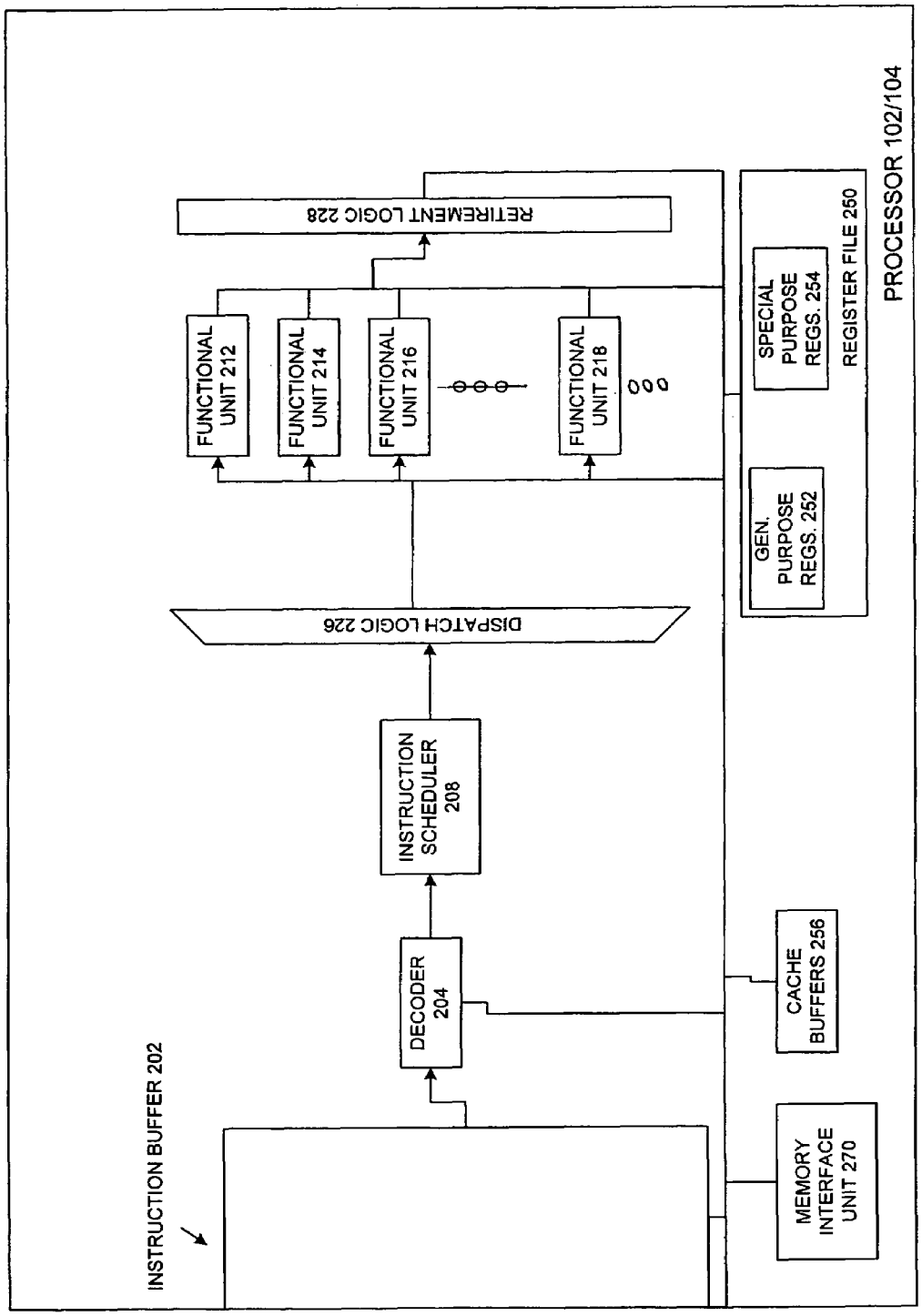
FIG. 2 illustrates a more detailed diagram of a processor and associated memory, according to embodiments of the present invention.

FIG. 2 illustrates a more detailed diagram of a processor, according to embodiments of the present invention. In particular, FIG. 2 illustrates a more detailed diagram of one of processors 102/104 (hereinafter "processor 102"). As shown, memory interface unit 270 is coupled to cache buffers 256, register file 250 (that includes general purpose registers 252 and special purpose registers 254) and instruction buffer 202, such that memory interface unit 270 can retrieve macro instructions and associated operands and store such data into instruction buffer 202 and cache buffers 256, general purpose registers 252 and/or special purpose registers 254. Additionally, cache buffers 256 and register file 250 are coupled to decoder 204, functional units 212, 214, 216, and 218 and retirement logic 228.

Decoder 204 is coupled to instruction buffer 202, such that decoder 204 retrieves the instructions from instruction buffer 202. Decoder 204 can receive these instructions and decode each of them to determine the given instruction and also to generate a number of instructions in an internal instruction set. For example, in one embodiment, the instructions received by decoder 204 are termed macro instructions, while the instructions that are generated by decoder 204 are termed micro instruction (or micro-operations). Decoder 204 is also coupled to instruction schedule 208, such that instruction scheduler 208 can receive these micro-operations for scheduled execution by functional units 212, 214, 216, and 218.

Instruction scheduler 208 is coupled to dispatch logic 226, such that the instruction scheduler 208 transmits the instructions to be executed by functional units 212, 214, 216, and 218. Dispatch logic 226 is coupled to functional units 212, 214, 216, and 218 such that dispatch logic 226 transmits the instructions to functional units 212, 214, 216, and 218 for execution. Functional units 212, 214, 216, and 218 can be one of a number of different execution units, including, but not limited to, an integer arithmetic logic unit (ALU), a floating-point unit, memory load/store unit, etc. Functional units 212, 214, 216, and 218 are also coupled to retirement logic 228, such that functional units 212, 214, 216, and 218 execute the instructions and transmit the results to retirement logic 228. Retirement logic 228 can transmit these results to memory that can be internal or external to processor 102, such as registers within register file 250 or cache buffers 256, or memory 132 (external to processor 102).

The operations of computer system 100 will now be described in more detail in conjunction with the flow diagram of FIG. 3. In particular, FIG. 3 illustrates a flow diagram for translation of instructions from a binary based on a first instruction set architecture to instructions from a second instruction set architecture that is partially compatible with the first instruction set architecture, according to embodiments of the present invention.

Figure 3:
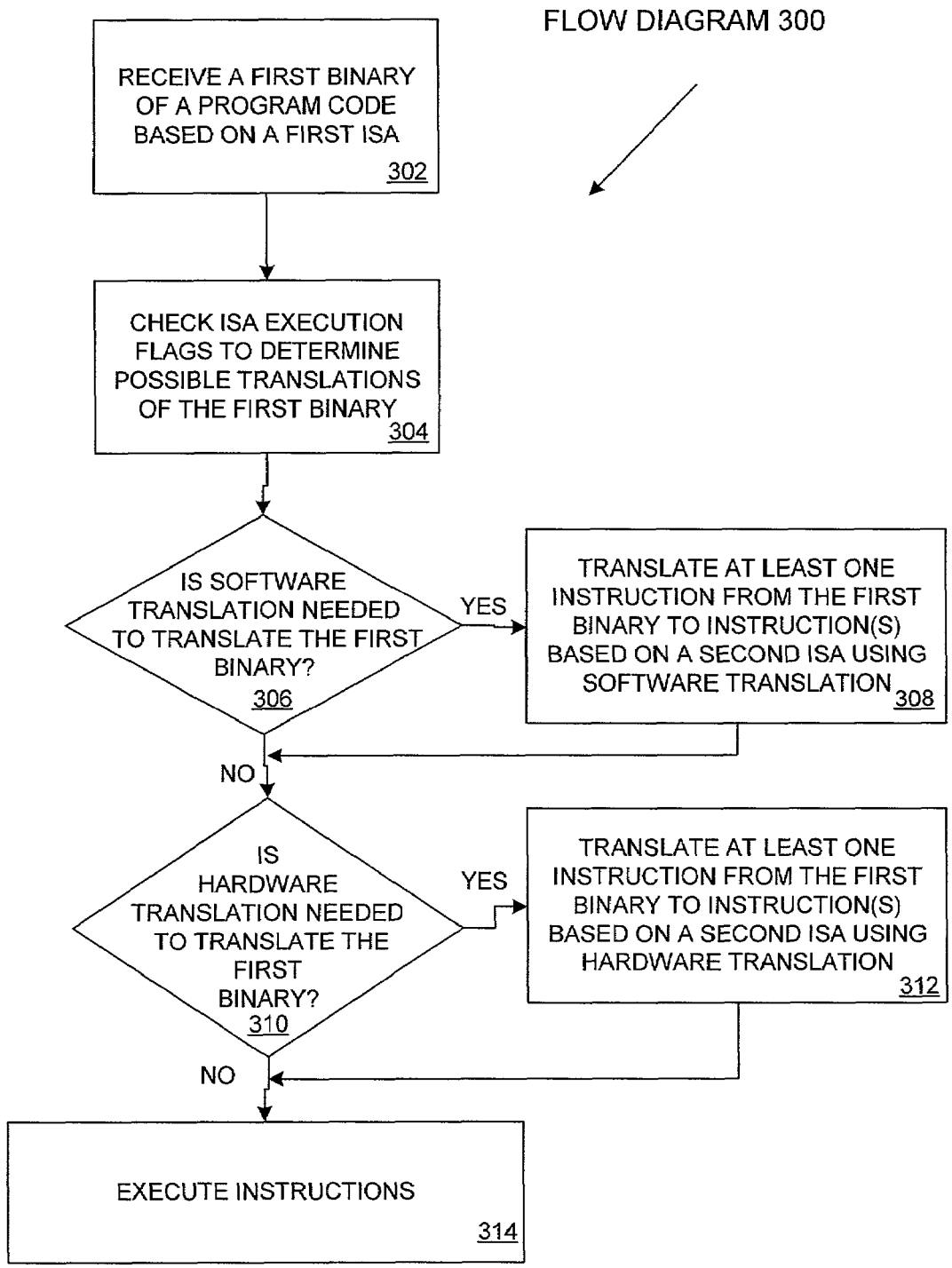
FIG. 3 illustrates a flow diagram for translation of instructions from a binary based on a first instruction set architecture to instructions from a second instruction set architecture that is partially compatible with the first instruction set architecture, according to embodiments of the present invention.

Flow diagram 300 of FIG. 3 is described as part of the decode-execute flow of computer system 100. However, embodiments of the present invention are not so limited. For example, in another embodiment, the translation operations illustrated in flow diagram 300 could be performed independent of the decode-execute flow of computer system 100. In one such embodiment, the translated instructions could be stored in a special buffer (either internal or external to processor 102), such as a trace cache (not shown in FIG. 1). Accordingly, such translated instructions could be retrieved from this special buffer and executed within processor 102. Therefore, in such an embodiment, the level of compatibility is optional, such that processor 102 may or may not execute the translated instructions depending on its current knowledge or resources. For example, the translated instructions may be executed in a first environment (wherein the translated instructions are fully exploited), while not being executed in a second environment (wherein the execution of the translated instructions does not increase performance execution). Moreover, in an embodiment, a subset of the translated instructions is incorporated into the execution of the binary. For example, a given instruction may be translated a number of times. However, in an embodiment, the number of times this translated instruction is incorporated into the execution of the binary is less than the total number of times the instruction is translated.

At process block 302, a first binary of a program code based on a first instruction set architecture is received. In one embodiment, translation unit 180 receives this first binary of a program code based on a first instruction set architecture. In an embodiment, decoder 204 receives this first binary of a program code based on a first instruction set architecture. In one embodiment, both translation unit 180 and decoder 204 can receive this first binary of a program code based on the first instruction set architecture.

In one embodiment, translation unit 180 is employed to perform a software translation of this first binary based on a first instruction set architecture into a second or different binary based on a combination of the first instruction set architecture and a second instruction set architecture. In an embodiment, decoder 204 is employed to perform a hardware translation of this first binary based on a first instruction set architecture into a second or different binary based on a combination of the first instruction set architecture and the second instruction set architecture. As will be described in more detail below, in one embodiment, software translation of a binary by translation unit 180 can be used in conjunction with hardware translation of a same binary by decoder 204. In another embodiment, software translation of a binary by translation unit 180 is exclusive of hardware translation of the same binary by decoder 204 and vice versa.

At process block 304, instruction set architecture execution flags are checked to determine possible translations of the first binary. In one embodiment, translation unit 180 checks instruction set architecture execution flags to determine possible translation of the first binary. In an embodiment, decoder 204 checks instruction set architecture execution flags to determine possible translation of the first binary. Although translation unit 180 can determine possible translation of the first binary through different techniques, in an embodiment, translation unit 180 determines this possible translation of the first binary by checking command line flags that are accepted in conjunction with the command to begin execution (that can include this translation) of this first binary. For example, if the name of the first binary were "binary.exe" the command that includes command line flags to began execution could be: "binary.exe-f64-s-o" wherein the command line flags are (1) f64(2)-s and (3)-o. These command line flags could indicate different translations of this first binary.

To help illustrate, translation unit 180 could interpret the "-s" as indicating a translation of a number of single instructions (based on an instruction set architecture that does not support Same Instruction Multiple Data (SIMD) operations) into one or more SIMD instructions within the second or different instruction set architecture that supports such operations. As will be described in more detail below, the different instruction set architecture execution flags described herein are by way of example and not by way of limitation, as other instructions and operations within the first binary based on the first instruction set architecture may be translated into other instructions and operations based on a second or different instruction set architecture. Moreover, in another embodiment (instead of and/or in conjunction with checking command line flags), translation unit 180 could determine this possible translation of the first binary by checking various memory locations, such as a register within register file 250 (shown in FIG. 2), to check for the possible different translations.

Returning to process block 304 of flow diagram 300 in FIG. 3, decoder 204 can also check instruction set architecture execution flags to determine possible translation of the first binary. In an embodiment, decoder 204 can check instruction set architecture execution flags by querying a register, such as one of special purpose registers 254 within register file 250 (illustrated in FIG. 2). In one such embodiment, a given bit is associated with a given type of translation. For example, bit zero is associated with a modification of the precision of floating-point operands (e.g., going from an 80-bit format for an Intel® IA-32 instruction set architecture to a 64-bit format for an Intel® IA-64 instruction set architecture). Accordingly, a different result based on less precise operands could be generated wherein the execution performance is greater, as processors typically execute instructions based on this second or different instruction set architecture more quickly in comparison to instructions based on the first instruction set architecture.

In an embodiment, these instruction set architecture execution flags stored in a register within processor 102 are set by architectural instructions that set and unset given flags within the register. In one such embodiment, these instructions can be employed by the operating system before executing the binary.

At process decision block 306, a decision is made regarding whether software translation is needed to translate the first binary. In one embodiment, translation unit 180 determines whether software translation is needed to translate the first binary. As described above, translation unit 180 can determine through one of a number of different ways whether software translation is needed to translate the first binary. The number of different ways include, but are not limited to, checking for command line flags at the initiation of the execution of the first binary and checking different memory locations, such as a register.

At process block 308, at least one instruction from the first binary is translated to at least one instruction based on the second instruction set architecture using software translation, upon determining that software translation is needed to translate the first binary. In an embodiment, translation unit 180 performs this translation. For example as described above, translation unit 180 could translate a number of single instructions (based on an instruction set architecture that does not support SIMD operations) into one or more SIMD instructions within the second or different instruction set architecture that supports such operations. To help illustrate, translation unit 180 could traverse the binary and determine that this binary includes four different instructions for addition, such that there are four different sets of operands. Accordingly, translation unit 180 could translate these four different instructions within this binary into a single instruction for addition wherein the two sets of four operands (32 bits each) are placed within two 128-bit SIMD registers within processor 102 for execution.

In an embodiment for this SIMD translation, the single instructions are based on a first instruction set architecture, while the SIMD instructions are based on a second instruction set architecture. In one embodiment for this SIMD translation, the single instructions are based on a first instruction set architecture, while the SIMD instructions are also based on the first instruction set architecture. Accordingly, the SIMD translation allows for an improvement in the instructions for a same instruction set architecture.

Such a translation could result in less precision as relates to the operands; however, the increase in performance allowed by this translation could outweigh the consideration for precision, depending on the type of application and/or the execution environment in which the application is being executed. Therefore, the programming environment, such as the user, is able to dictate which types of translations can occur while considering the loss in precision in relation to the increase in performance. For example, some graphics applications that employ only a portion of the full floating-point precision may tolerate a small imprecision in floating-point operations. In contrast, applications for predicting the weather that employ the full floating-point precision in their floating-point operations would not tolerate a small imprecision, as such imprecision could generate different and possibly inaccurate results.

Moreover, a same application may tolerate such modifications of the precision of the operands differently depending on the execution environment. For example, an application could tolerate such modifications of precision for a first set of input data, while a same application could not tolerate such modifications of precision for a different set of input data. To help illustrate, when the set of input data has been validated prior to execution of such data by the application, the application is not required to handle precise exceptions. Conversely, if the set of input data is considered special and/or has not been validated, the application may be required to perform exception handling that provides precise and complete data for the exceptions. Therefore, the programming environment could account for such differences in the set of input data and allow for the translation in the first scenario and preclude the translation in the second scenario.

Another example of software translation by translation unit 180 includes optimizations related to the program stack. In particular, a given instruction set architecture, such as the Intel® IA-32 instruction set architecture, can include a hardware stack with push and pop operations, wherein data being passed into a procedure of a program are placed onto the stack through a push operation and removed from the stack through a pop operation after completion of the procedure. Moreover, such instruction set architectures can allow direct access to the stack pointer (typically stored in one of special purpose registers 254). Therefore, because this instruction set architecture allows for explicit access to the stack pointer, binaries of applications can make non-conventional accesses to this hardware stack.

For example, assume the program enters a procedure and stores a value "V" on some location "L" in the stack, using some constant displacement from the stack pointer. The program then returns from the procedure. However, in certain instruction set architectures, the value "V" is not explicitly deleted from the stack. Further, such instruction set architectures ensure that the program is to still able to access the value "V" from the stack based on the location "L" in reference to the stack pointer (assuming that this location has not been overwritten by other portions of the program). Conversely, a different instruction set architecture may include a mode wherein the hardware stack has more abstract semantics and the contents of the released stack memory is volatile. In particular, this different instruction set architecture may not ensure that the value "V" is still stored in location "L" in reference to the stack pointer subsequent to the completion of the procedure.

Accordingly, in an embodiment, translation unit 180 can translate the first binary into a different binary wherein at least one of the procedures are in-lined with the program code that called the procedure. For example, if the main procedure, "main( )", included an invocation of a procedure "first_procedure(x,y)" wherein five lines of code are included within "first_procedure(x,y)", translation unit 180 can modify the binary such that the procedure call is removed and the five lines of code are included within "main( )" directly. Accordingly, parameters x and y would not be placed on the stack. However, because this different binary is based on the second instruction set architecture as related to dereferencing of the stack pointer subsequent to a return from a procedure call for a parameter within the procedure call, the program code will not include such de-referencing. As will be described in more detail below, because the binary is based on an instruction set architecture that ensures that the value "V" will not be accessed by location "L" in reference to the stack pointer subsequent to the completion of the procedure, hardware translation by decoder 204 can also be performed in conjunction with and/or exclusive of this software translation.

Returning to flow diagram 300 of FIG. 3 at process block 310, independent of whether software translation is performed at process block 308, in an embodiment, a decision is made regarding whether a hardware translation is needed to perform a translation of the first binary. In one embodiment, decoder 204 determines whether hardware translation is needed to translate the first binary. As described above, decoder 204 can determine through one of a number of different ways whether hardware translation is needed to translate the first binary. The number of different ways include, but are not limited to, querying a register, such as one of special purpose registers 254 within register file 250 (illustrated in FIG. 2).

At process block 312, at least one instruction is translated from the first binary to at least one instruction based on a second instruction set architecture, upon determining that hardware translation is needed to translate the first binary. In one embodiment, decoder 204 translates at least one instruction from the first binary to at least one instruction based on a second instruction set architecture. In particular, in an embodiment, decoder may perform a number of different translations related to different features of the second instruction set architecture.

To help illustrate, assume that processor 102 can execute instructions based on both Intel® IA-32 and Intel® IA-64 instruction set architectures and that a first binary has been generated based on the Intel® IA-32 such that the floating-point operands have a width of 80 bits. Additionally, prior to or in conjunction with the execution of a given binary, one of special registers 254 could be set to indicate that floating-point operands, which are currently 80-bit operands based on the Intel® IA-32 instruction set architecture are to be converted to 64-bit operands based on the Intel® IA-64 instruction set architecture. Therefore, upon querying this special register, decoder 204 translates floating-point instructions based on the Intel® IA-32 instruction set architecture to a different set of floating-point instructions based on Intel® IA-64 instruction set architecture.

For example, upon receiving a floating-point multiply instruction, decoder 204 generates the micro-operations for the Intel® IA-64 instruction set architecture (instead of the micro-operations for the Intel® IA-32 instruction set architecture), thereby directing the associated floating-point unit (among functional units 212, 214, 216, and 218) to modify the 80-bit operands to be 64-bit operands and to execute the floating-point multiply instruction as the associated instruction for the Intel® IA-64 instruction set architecture. Therefore, the precision of the floating-point operands will be reduced; however, the floating-point instructions being based on the new instruction set architecture could increase performance in the execution of the application.

Another example of hardware translation by decoder 204 includes optimizations related to the program stack. In particular, as described above, a given instruction set architecture, such as the Intel® IA-32 instruction set architecture, can include a hardware stack with push and pop operations, wherein data being passed into a procedure of a program are placed onto the stack through a push operation and removed from the stack through a pop operation after completion of the procedure. Moreover, such instruction set architectures can allow direct access to the stack pointer (typically stored in one of special purpose registers 254). Therefore, because this instruction set architecture allows for explicit access to the stack pointer, binaries or applications can make non-conventional accesses to this hardware stack.

For example, the program enters a procedure and stores a value "V" on some location "L" in the stack, using some constant displacement from the stack pointer. The program then returns from the procedure. However, in certain instruction set architectures, the value "V" is not explicitly deleted from the stack. Further, such instruction set architectures ensure that the program is to still be able to access the value "V" from the stack based on the location "L" in reference to the stack pointer (assuming that this location has not been overwritten by other portions of the program). Conversely, a different instruction set architecture may include a mode wherein the hardware stack has more abstract semantics and the contents of the released stack memory is volatile. In particular, this different instruction set architecture may not ensure that the value "V" is still stored in location "L" in reference to the stack pointer subsequent to the completion of the procedure.

Figure 4:
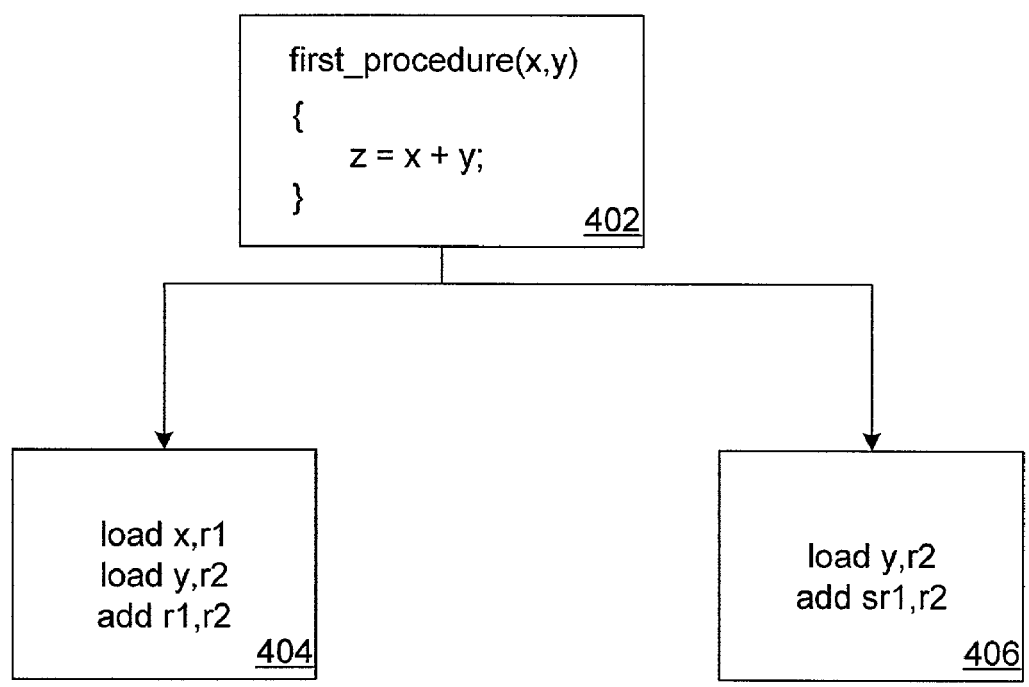
FIG. 4 illustrates source code and the generated assembly code wherein a register is and is not employed as part of the hardware stack, according to embodiments of the present invention.

Therefore, in an embodiment, one of special purpose registers 254 can be employed as part of the hardware stack in addition to the stack within memory, such as memory 132, external to processor 102. Accordingly, this reduces the number of load and store operations by functional units 212, 214, 216, and 218 association with the hardware stack. In particular, FIG. 4 illustrates source code and the generated assembly code wherein a register is and is not employed as part of the hardware stack, according to embodiments of the present invention. As shown, FIG. 4 includes source code 402, assembly code 404 and assembly code 406. Assembly code 404 includes portions of the assembly code instructions generated for source code 402 when a register within processor 102 is not employed as part of the hardware stack. Assembly code 406 includes portions of the assembly code instructions generated for source code 402 when a register within processor 102 is employed as part of the hardware stack.

Source code 402 includes a procedure with parameters "x" and "y", wherein an instruction within the procedure set a variable "z" equal to the addition of "x" and "y". Assembly code 404 includes a load operation to store the value of "x" into register "r1"; a load operation to store the value of "y" into register "r2"; and an add operation of register "r1" with register "r2". As illustrated, two different load operations are needed to bring the values of "x" and "y" (stored on the stack in external memory) into registers internal to processor 102. In contrast, assembly code 406 (wherein a special register within processor 102 is employed as part of the hardware stack) includes a single load operation followed by an add operation. In particular, assembly code 406 includes a load operation to store the value of "y" into register "r2"; and an add operation of special register "sr1" with register "r2" (wherein special register "sr1" is part of the hardware stack).

As shown, at least one special purpose register within special purpose registers 254 can be employed as part of the program stack when the programming environment, such as the user, indicates that accesses to variables on the program stack will not be made subsequent to the pop operations for these variables (even though the first instruction set architecture on which the first binary was generated allows for such accesses). Accordingly, decoder 204 can generate the associated micro-operations for assembly code 406 (instead of the associated micro-operations for assembly code 404) when a particular instruction set architecture execution flag is set indicating that the program or application being executed will not attempt to access data parameters on the stack subsequent to the completion of the procedure having these data parameters.

Another example of hardware translation by components of processor 102 relates to out-of-order access to memory. In particular, a program based on a first instruction set architecture may guarantee in-order access to memory (both internal and external to processor 102). Therefore, in order to guarantee the compatibility of the binary with the first instruction set architecture, memory accesses during execution of this binary must be serialized. This serialization can slow down the execution performance of the binary. For example, if a first instruction needs to complete a load operation from an address not yet known, while a second instruction (which is to be executed after the first instruction in the serial execution of the binary) also needs to complete a store operation to an address that is already known, the first instruction must still be completed prior to retirement of the second instruction, even though the store operation of the second instruction could have been completed while waiting for the address needed for the load operation of the first instruction. Such serialization is crucial for guaranteeing the correct execution of multi-process or multi-processor systems.

In contrast, a second instruction set architecture may allow for out-of-order memory accesses as well as ways to order such accesses after the accesses have completed. Accordingly, if the programming environment, such as the user, can ensure that the binary based on the first instruction set architecture does not require serialization of instruction execution, the programming environment can set the associated instruction set architecture execution flag to allow for out-of-order memory accesses, thereby allowing for possible increases in performance execution of the binary. For example, if the binary is a single threaded program with no synchronization with other concurrent processes or devices, the binary can then be safely executed in a mode allowing for out-of-order memory accesses.

Therefore, in an embodiment, upon determining that out-of-order memory accesses are allowed (for a binary that is based on an instruction set architecture that does not provide for such accesses), decoder 204 can instruct memory interface unit 270 to schedule accesses of memory for this binary out-of-order in reference to the order of the instructions within the binary.

In an embodiment, an example of hardware translation by components of computer system 100 relates to self-modifying code. In particular, self-modifying code includes code that writes to memory locations where the code itself resides. A number of instruction set architectures allow for execution of such code. However, such code is inefficient and decreases the performance of the execution of the code. In particular, memory controllers and/or other components are required to track the locations where memory is written in order to determine if the code is self-modifying. In other words, these memory controllers and/or other components determine if, for each memory write, the location in memory that is being written by the code includes the code itself.

In contrast, a second instruction set architecture may operate in a mode in which self-modifying code is not allowed. Accordingly, if the programming environment, such as the user, can ensure that the binary based on the first instruction set architecture does not include self-modifying code, the programming environment can set the associated instruction set architecture execution flag to eliminate the checking of whether a given program code is modifying itself.

Therefore, in an embodiment, upon determining that the program code on which the binary is based is not self-modifying, decoder 204 can instruct memory controllers associated with memory that stores the binary not to check whether the given program code is modifying itself. Accordingly, each time a memory write operation is executed, such memory controllers would not check to see if the location of this memory write is within the locations wherein the program code resides, thereby increasing the speed of execution of the binary.

In an embodiment, hardware translation by components of computer system 100 relates to memory segmentation. In particular, memory segmentation is used for extending a program code's accessible address space. For example, a given architecture may have had limits on the size of the widths of the registers, thereby limiting the size of the address space. Accordingly, a given program code/binary can access data that is stored across a number of different segments in memory. In one embodiment, a value, which is stored in one of special purpose registers 254, is employed as an offset for converting from the virtual to the physical address space. In an embodiment, this value is added to the virtual address to generate the physical address. Therefore, if the binary is accessing data across a number of segments in memory, this value is updated during program execution when the segment from which data is being accessed is changed. In contrast, more recent architectures define larger register widths, such as 32 bit or 64 bit, thereby allowing operating systems executing on such architectures to offer programs with a sufficiently larger virtual address space without relying on segmentation.

In one embodiment, the first binary is based on a first instruction set architecture wherein the data accessed by the first binary is stored within a number of segments in memory. Additionally, in an embodiment, a second instruction set architecture includes a virtual address space that is larger than the virtual address space for the first instruction set architecture. Accordingly, if the programming environment, such as the user, can ensure that the data accessed by the first binary based on the first instruction set architecture can be stored in a single segment in memory based on the second instruction set architecture, the programming environment can set the associated execution flag to ignore memory segmentation, thereby bypassing segmentation during the virtual-to-physical translation of memory addresses.

In one embodiment, the larger widths of registers within register file 250 are employed to allow for the larger virtual address space. For example, the first instruction set architecture may use 16 bits of registers, which have a width of 32 bits, stored in register file 250, while the second instruction set architecture may use the full 32 bits of such registers. In an embodiment, decoder 204 does not generate micro-operations to update this offset value for virtual to physical address space stored in one of special purpose registers 254, as this value remains constant over the course of execution of the binary (as the data accessed by the binary is within a single segment in memory). Accordingly, the execution of the binary is increased as memory segmentation is ignored based on the second instruction set architecture.

Moreover, in an embodiment, a binary based on a first instruction set architecture is generated such that the size of the data accessed by the binary can be stored in a single segment in memory. Accordingly, the widths of the values stored in general purpose registers 252 do not need to be increased. In an embodiment, the programming environment can set an instruction set architecture execution flag wherein the binary is not based on the second instruction architecture as relates to the larger width in the registers. In one such embodiment, decoder 204 does not generate micro-operations to update this offset value for virtual to physical address space stored in one of special registers 254. In particular, this value does not need to be updated because the data accessed by the binary is stored in a single segment in memory.

Returning to flow diagram 300 of FIG. 3, at process block 314, the instructions (that may have been modified as described above) are executed. In an embodiment, functional units 212, 214, 216, and 218 execute the instructions. The software and hardware translations described herein are by way of example and not by way of limitation, as embodiments of the present invention can include other translations (both software and hardware) of a first binary based on a first instruction set architecture to a second binary based on a combination of the first instruction set architecture and a second instruction set architecture. Moreover, while a given translation has been described in reference to software or hardware, embodiments of the present invention are not so limited. For example, while a given translation has been described in relationship to a software translation, in another embodiment, such a translation can be performed in hardware and/or a combination of the hardware and software.

Moreover, embodiments of the present invention related to software translation are described in relationship to translations of an entire binary. However, embodiments of the present invention are not so limited. In an embodiment, a programming model can include more complex interaction between binary-level objects. For example, assume a shared library of binaries are compiled based on a first instruction set architecture and a main binary that uses/interfaces with binaries in the shared library is based on a combination of the first and second instruction set architectures, as described herein. In an embodiment, the main binary may switch among the different functions of the two different instruction set architectures, depending on the required functionality, programming environment, etc. For example, the binaries within the library may dynamically set the level of compatibility between the first and second instruction architecture, depending on which binary in the library is called, the global program state of the main binary, etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine-readable medium selected from the group consisting of a memory, a read only memory (ROM), a random access memory (RAM), a magnetic disk storage media, an optical storage media, and a flash memory device, that provides instructions, which when executed by a machine, cause the machine to perform operations comprising:

receiving a binary of a program code, the binary based on a first instruction set architecture;

checking one or more settable compatibility controls defined on top of a second instruction set architecture that have been set by a program environment, wherein the one or more settable compatibility controls indicate a compatibility with which the binary is to be translated; and translating the binary to a translated binary based on the one or more settable compatibility controls, wherein the translated binary is based at least in part on the second instruction set architecture, and wherein the translating is performed without fully preserving program semantics of the binary by deviating from the program semantics of the binary in exchange for improved execution performance of the translated binary according to the one or more settable compatibility controls.

2. The machine-readable medium of claim 1, wherein said translating comprises storing a portion of a hardware stack in a register of a processor translating the binary.

3. A method comprising:

receiving a binary of a program code, the binary based on a first instruction set architecture;

checking one or more settable compatibility modes that have been set by a programming environment to indicate a compatibility level with which to perform a translation;

translating the binary to a translated binary that is based at least in part on a second instruction set architecture, wherein said translating includes using the compatibility level indicated by the one or more settable compatibility modes, and wherein said translating includes deviating from precise program semantics of the binary in exchange for improved execution performance of the translated binary according to the one or mare settable compatibility modes; and executing the translated binary.

4. The method of claim 3, wherein the one or more settable compatibility modes control a level of semantic compatibility between the binary and the translated binary.

5. The method of claim 3, further comprising an operating system setting the one or more compatibility modes system.

6. The method of claim 3, wherein further comprising a user setting the one or more compatibility modes.

7. The method of claim 3, further comprising setting the one or more compatibility modes based on one or more command line flags associated with a command.

8. The method of claim 3, further comprising storing the one or more compatibility modes in a register of a processor translating the binary.

9. The method of claim 3, wherein the first instruction set architecture includes in-order accesses to memory and the second instruction set architecture includes out-of-order accesses to memory, the translating of the binary to include out-of-order accesses to memory by a processor executing the binary.

10. The method of claim 3, wherein the first instruction set architecture allows for self-modifying code and the second instruction set architecture does not allow for self-modifying code, the translating of the binary to include providing an instruction to controllers of memories that store the binary to perform write operations independent of checks of whether the write operations modify a location where the binary is stored.

11. The method of claim 3, wherein the second instruction set architecture has an address space that is larger than the first instruction set architecture, and wherein the translating of the binary comprises using the address space of the second instruction set architecture.

12. The method of claim 3, wherein data accessed by the binary is stored in a single segment in memory, and wherein an offset value for translating a virtual address to a physical address for the data is not modified during execution of the binary.

13. A system comprising:

a dynamic random access memory to include a binary of a program code based on a first instruction set architecture;

a processor coupled to the dynamic random access memory to translate the binary to a translated binary that is based at least in part on a second instruction set architecture, wherein the processor is to translate the binary by deviating from precise semantics of the binary in exchange for advantages offered by the second instruction set architecture based on one or more settable controls that have been set by a programming environment to control the deviation.

14. The system of claim 13, wherein the processor is to store the settable controls in a register.

15. The system of claim 13, wherein the second instruction set architecture has an address space that is larger than the first instruction set architecture, and wherein the translated binary uses the address space of the second instruction set architecture.

16. The system of claim 13, wherein the binary is stored in a single segment in the memory, and wherein an offset value for translating a virtual address to a physical address is not modified during execution of the binary.

17. An apparatus comprising:

at least one register to store at least one settable flag, the at least one settable flag being settable by a program environment to control a compatibility level of a translation of a binary based on a first instruction set architecture to a translated binary based in part on a second instruction set architecture;

a decoder to receive the binary and to check the at least one settable flag in the at least one register, the decoder to translate the binary based at least in part on the settable flag, wherein the decoder is to deviate from precise program semantics of the binary in exchange for improved execution performance of the translated binary according to the at least one settable flag.

18. The apparatus of claim 17, wherein the at least one settable flag controls a level of semantic compatibility with which to translate the binary.

19. The apparatus of claim 17, wherein the at least one settable flag is settable by a user.

20. The apparatus of claim 17, wherein the translating of the binary comprises storing a portion of a hardware stack in a register of the at least one register.

21. The apparatus of claim 17, wherein the apparatus is coupled to a memory to store the binary, wherein the first instruction set architecture allows for self-modifying code and the second instruction set architecture does not allow for self-modifying code, the translating of the binary to include an instruction to a controller of the memory to cause the memory controller not to check whether code is self modifying.

22. The apparatus of claim 17, wherein the second instruction set architecture has an address space that is larger than the first instruction set architecture, and wherein the translating of the binary comprises using the address space of the second instruction set architecture.

23. The apparatus of claim 17, wherein data accessed by the binary is stored in a single segment in memory coupled to the apparatus, and wherein an offset value for translating a virtual address to a physical address for the data is not modified during execution of the binary.

24. A machine-readable medium selected from the group consisting of a memory, a read only memory (ROM), a random access memory (RAM), a magnetic disk storage media, an optical storage media, and a flash memory device, that provides instructions, which when executed by a machine, cause the machine to perform operations comprising:

checking one or more settable compatibility modes that have been set by a programming environment to indicate a compatibility level with which to perform a translation of a binary based on a first instruction set architecture to a translated binary that is based at least in part on a second instruction set architecture; and translating the binary to the translated binary, wherein said translating is based at least in part on the one or more settable compatibility modes, and wherein said translating is performed without fully preserving program semantics of the binary by deviating from the program semantics of the binary in exchange for improved execution performance of the translated binary according to the one or more settable compatibility modes.

25. The machine-readable medium of claim 24, wherein the one or more settable compatibility modes control a level of semantic compatibility between the binary and the translated binary.

26. The machine-readable medium of claim 24, wherein the compatibility modes are set by a user.

27. The machine-readable medium of claim 24, wherein said checking the compatibility modes comprises checking one or more command line flags associated with a command.

28. The machine-readable medium of claim 24, wherein said checking the compatibility modes comprises checking one or more registers of a processor.

29. The machine-readable medium of claim 24, wherein the first instruction set architecture allows for self modifying code and the second instruction set architecture does not allow for self modifying code, the translating of the binary to include an instruction to a controller of a memory to store the binary not to check whether a write operation modifies a location where the binary is stored.

30. A system comprising:

a dynamic random access memory to store a binary that is based on a first instruction set architecture that allows binaries to self modify;

a memory controller associated with the dynamic random access memory;

a translation logic coupled to the dynamic random access memory to receive the binary, the translation logic is to translate the binary to a translated binary that is based, at least in part, on a second instruction set architecture that does not allow binaries to self modify, wherein during the translation the translating logic is to instruct the memory controller not to check whether the binary is self modifying each time a memory write operation is executed.

31. The system of claim 30, wherein the translation logic is to translate the binary based on at least one settable control that is settable by a program environment.

32. The system of claim 31, wherein the at least one settable control controls a level of semantic compatibility between the binary and the translated binary.

33. The system of claim 31, wherein the at least one settable control allows the decoder to deviate from precise semantics of the binary in exchange for advantages offered by the second instruction set architecture.

* * * * *

UNITED STATES PATENT AND TRADEMARK OFFICE
CERTIFICATE OF CORRECTION

| | | |
|---|---|---|
| PATENT NO. | : 7,251,811 B2 | Page 1 of 1 |
| APPLICATION NO. | : 10/039254 | |
| DATED | : July 31, 2007 | |
| INVENTOR(S) | : Rosner et al. | |

It is certified that error appears in the above-identified patent and that said Letters Patent is hereby corrected as shown below:

In column 13, at line 34, delete "mare" and insert --more--.
In column 13, at line 41, delete the second occurrence of "system".

Signed and Sealed this

Fifteenth Day of April, 2008

JON W. DUDAS
*Director of the United States Patent and Trademark Office*